(12) United States Patent
Dieterich et al.

(10) Patent No.: US 10,203,044 B2
(45) Date of Patent: Feb. 12, 2019

(54) ELECTRICALLY ACTUATED VALVE

(71) Applicant: Mahle International GmbH, Stuttgart (DE)

(72) Inventors: Mario Dieterich, Murrhardt (DE); Stefan Helmrich, Stuttgart (DE); Bert Hiller, Weinstadt (DE); Hans-Peter Klein, Leutenbach (DE); Jeremia Voellinger, Ludwigsburg (DE); Radoslaw Zurel, Remseck (DE)

(73) Assignee: Mahle International GmbH (DE)

( * ) Notice: Subject to any disclaimer, the term of this patent is extended or adjusted under 35 U.S.C. 154(b) by 94 days.

(21) Appl. No.: 15/275,324

(22) Filed: Sep. 23, 2016

(65) Prior Publication Data

US 2017/0089482 A1 Mar. 30, 2017

(30) Foreign Application Priority Data

Sep. 24, 2015 (DE) .................. 10 2015 218 391

(51) Int. Cl.
*F16K 31/04* (2006.01)
*F01P 7/16* (2006.01)
(Continued)

(52) U.S. Cl.
CPC ............ *F16K 31/041* (2013.01); *F01P 7/167* (2013.01); *F16K 11/0856* (2013.01); *F01P 2007/146* (2013.01)

(58) Field of Classification Search
CPC .... F16K 31/041; F16K 11/0856; F01P 7/167; F01P 2007/146; Y10T 137/86871; Y10T 137/86662
(Continued)

(56) References Cited

U.S. PATENT DOCUMENTS 2,845,948 A * 8/1958 Parker .................. F16K 11/078
137/625.41
3,111,299 A * 11/1963 Miller .................. F16K 27/065
251/175
(Continued)

FOREIGN PATENT DOCUMENTS

DE      41 25 366 C1    3/1993
DE      43 24 749 A1    1/1995
(Continued)

OTHER PUBLICATIONS

European Search Report for EP 16187638.8 dated Dec. 19, 2016.
German search report dated Oct. 26, 2017.

*Primary Examiner* — Eric Keasel
(74) *Attorney, Agent, or Firm* — Fishman Stewart PLLC

(57) ABSTRACT

An electrically actuated valve may include a housing and a cylindrical valve body mounted rotatably therein. The housing may have at least one casing-side inlet and at least one casing-side outlet. The valve body may have at least one casing-side opening, via which the inlet may be at least one of connectable to the outlet and able to be shut off from the outlet dependent on a rotary angle. A recess extending at least partially around at least one of the inlet and the outlet may be provided on an inner casing face of the housing. At least one sealing element may be provided with a base made from a first material, and a saddle-shaped sealing sliding body made from a second material joined to the first. The sealing element may engage with the base into the recess, and may slide with the sealing sliding body on the valve body.

17 Claims, 3 Drawing Sheets

(51) Int. Cl.
*F16K 11/085* (2006.01)
*F01P 7/14* (2006.01)

(58) Field of Classification Search
USPC ....... 137/625.47, 625.24; 251/310, 311, 316, 251/317
See application file for complete search history.

(56) References Cited

U.S. PATENT DOCUMENTS

| | | | | |
|---|---|---|---|---|
| 3,165,122 | A * | 1/1965 | Sachnik | F15B 13/04 137/625.47 |
| 3,498,318 | A * | 3/1970 | Duffey | F16K 5/0271 137/375 |
| 3,605,792 | A * | 9/1971 | Westbrook | F16K 5/0464 137/312 |
| 3,907,688 | A * | 9/1975 | Close | B01D 35/043 137/625.47 |
| 4,055,324 | A * | 10/1977 | Hughes | F16K 5/04 251/309 |
| 4,427,057 | A * | 1/1984 | Bouvot | B60H 1/00485 123/41.08 |
| 5,139,050 | A * | 8/1992 | Otto | B01D 35/043 137/625.29 |
| 5,529,026 | A | 6/1996 | Kurr et al. | |
| 7,168,397 | B2 * | 1/2007 | Chanfreau | B60H 1/00485 123/41.01 |
| 8,919,378 | B2 * | 12/2014 | Bartnick | F16K 11/0856 137/625.47 |
| 9,115,634 | B2 | 8/2015 | Triebe et al. | |
| 2014/0326343 | A1 | 11/2014 | Klein | |

FOREIGN PATENT DOCUMENTS

| | | |
|---|---|---|
| DE | 44 16 039 C1 | 8/1995 |
| DE | 103 21 880 A1 | 12/2004 |
| DE | 10 2009 020 186 A1 | 1/2011 |
| DE | 10 2013 208 193 A1 | 11/2014 |
| EP | 1 318 337 A2 | 6/2003 |
| EP | 1 857 247 A1 | 11/2007 |
| JP | 2003-314 716 A | 11/2003 |
| WO | WO-2008/049624 A2 | 5/2008 |

\* cited by examiner

ELECTRICALLY ACTUATED VALVE

CROSS-REFERENCE TO RELATED APPLICATIONS

This application claims priority to German Patent Application No. DE 10 2015 218 391.2, filed on Sep. 24, 2015, the contents of which are hereby incorporated by reference in their entirety.

TECHNICAL FIELD

The present invention relates to an electrically actuated valve for regulating a volumetric flow in a heating and/or cooling system of a motor vehicle.

BACKGROUND

DE 10 2013 208 193 A1 has disclosed an electrically actuated valve of the generic type having a housing and a valve body which is mounted rotatably therein. Here, the housing has at least one casing-side inlet and at least one casing-side outlet, the valve body having at least one casing-side opening, via which the at least one inlet can be connected to the at least one outlet or can be shut off from it in a manner which is dependent on the rotary angle.

DE 43 24 749 A1 has disclosed a further regulating valve, comprising a housing with a cylindrical valve chamber, the valve chamber being provided with at least one inflow and at least two outflows. Here, the inflow and the outflows can be closed at least partially as required by way of a common valve body which can be rotated about an axis and is arranged in the valve chamber, the valve body being configured as a rotary slide and being actuable by a drive. In addition, the valve body has an extent in the circumferential direction of the valve chamber, which extent is delimited in each case by way of an edge, the outflow edge which moves over the inflow during opening thereof having an elliptical indentation which extends in the axial direction. As a result, it is to be possible, in particular, to significantly reduce the actuating forces of the valve body for opening the inflow.

A disadvantage in the known methods, however, is their comparatively complex assembly.

SUMMARY

The present invention is concerned with the problem of specifying an improved or at least an alternative embodiment for an electrically actuated valve of the generic type, which embodiment can be assembled more easily, in particular.

This problem is solved according to the invention by way of the subject matter of the independent claims. Advantageous embodiments are the subject matter of the dependent claims.

Here, the present invention is based on the general concept of configuring at least one sealing element for a cylindrical valve body in such a way that the said sealing element can be assembled simply into a recess in a housing, which recess is provided correspondingly for this purpose, and a cylindrical body can subsequently be inserted by way of simple axial pushing into the housing. Here, the electrically actuated valve according to the invention serves to regulate a volumetric flow in a heating and/or cooling system of a motor vehicle and, in a known manner, has a housing and the cylindrical valve body which is mounted rotatably therein. Here, the housing has at least one casing-side inlet and at least one casing-side outlet, the valve body itself having at least one casing-side opening, via which the at least one inlet can be connected to the at least one outlet or can be shut off from it in a manner which is dependent on the rotary angle. According to the invention, a recess (groove) which extends at least partially around the at least one inlet and/or outlet is then provided on an inner casing surface of the housing, the abovementioned at least one sealing element having a base made from a first material and a saddle-shaped sealing sliding body made from a second material which is joined to the former. Here, the at least one sealing element engages with its base into the recess and slides with its sealing sliding body on the valve body when the valve is assembled. Firstly, a reliable seal and secondly simplified assembly can be achieved by way of the saddle-shaped sealing element, since first of all merely the at least one sealing element has to be inserted with its base into the associated recess on the inner casing face of the housing and subsequently the valve body has to be pushed into the housing in the axial direction with radial displacement of the at least one sealing element.

In one advantageous development of the solution according to the invention, the valve body is mounted rotatably in the housing of the valve via at least one plain bearing. Long term smooth-running mounting of the valve body and the housing can be achieved by means of a plain bearing of this type.

In one advantageous development of the solution according to the invention, the housing has at least one unregulated inlet and at least one unregulated outlet. An unregulated inlet or outlet of this type can be utilized, for example, by a bypass flow which bypasses the actual valve, and therefore always ensures, for example, a desired minimum flow quantity.

The first material for the base of the sealing element expediently has an elastomer, in particular ethylene propylene diene monomer rubber (EPDM), hydrogenated acrylonitrile butadiene rubber (HNBR), fluorocarbon rubber (FKM) or ethylene acrylic rubber (AEM). AEM rubber is considered to be heat-resistant. HNBR rubber is distinguished, in particular, by an improved weather resistance and by a resistance to mineral oils and a comparatively high temperature resistance. EPDM rubber in turn likewise has a high chemical resistance and a high elasticity and, as a result, can be inserted particularly simply into the housing-side recesses.

In a further advantageous embodiment of the solution according to the invention, the second material for the sealing sliding body has (PTFE). PTFE plastics are extremely resistant to oils, but also to petrol and alcohol, and can be used in a high temperature range. On account of the very low coefficient of friction, a PTFE plastic of this type makes easy mobility of the valve body possible for the sealing sliding body.

In a further advantageous embodiment of the valve according to the invention, the at least one sealing element is configured as a two-component plastic injection moulded part. As a result, production of the sealing element is possible which is not only of very high quality, but rather at the same time is also inexpensive.

The valve body expediently has an insertion bevel (chamfer) on one end side. The described insertion bevel serves to facilitate axial pushing in and therefore assembly of the valve, which insertion bevel, in particular, reliably prevents tilting of the valve body in the housing or on the sealing elements which are inserted therein, and assists, during pushing in, pushing of the valve body over the sealing elements and pressing the latter radially outwards. An insertion bevel of this type can be realised in a comparatively simple manner, for example, via a plastic injection moulding die of corresponding configuration.

Further important features and advantages of the invention result from the subclaims, from the drawings and from the associated description of the figures using the drawings.

It goes without saying that the features which are mentioned in the above text and are still to be described in the following text can be used not only in the respectively specified combination, but rather also in other combinations or on their own, without departing from the scope of the present invention.

Preferred exemplary embodiments of the invention are shown in the drawings and will be explained in greater detail in the following description, identical reference numerals relating to identical or similar or functionally identical components.

DETAILED DESCRIPTION

Figure 1:
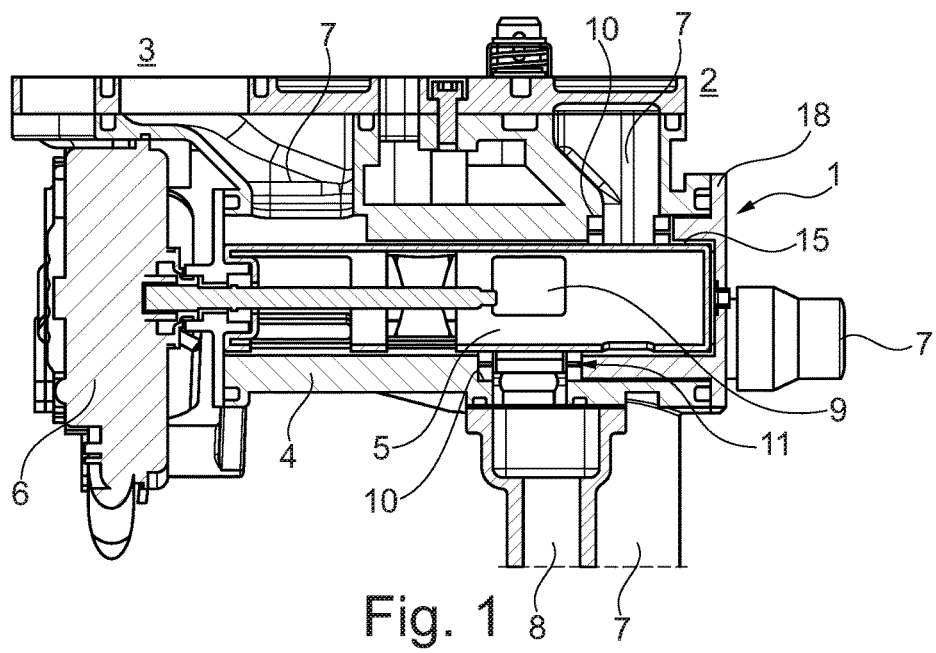
FIG. 1 shows an electrically actuated valve according to the invention for regulating at least one volumetric flow in a heating and/or cooling system of a motor vehicle in a sectional illustration.
Figure 2:
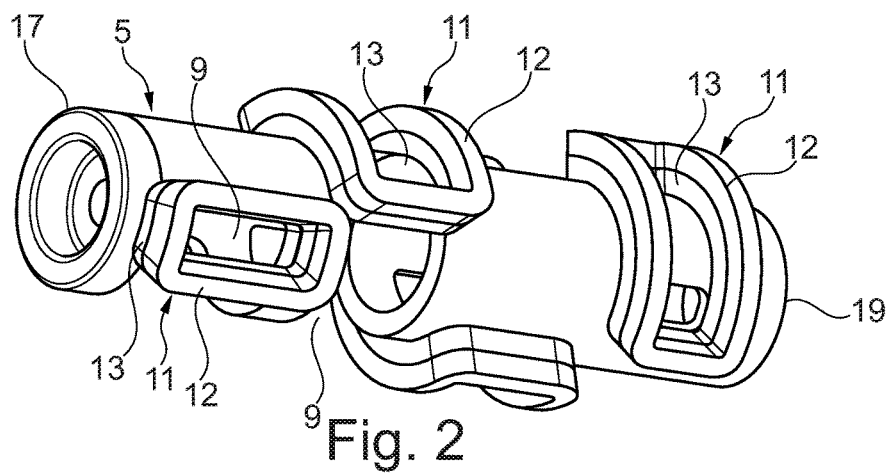
FIG. 2 shows a valve body according to the invention with sealing elements which interact with it, but without a housing.

In accordance with FIG. 1, an electrically actuated valve 1 according to the invention for regulating at least one volumetric flow in a heating and/or cooling system 2 of a motor vehicle 3 has a housing 4 and a cylindrical valve body 5 which is mounted rotatably therein. Here, a rotational movement of the valve body 5 is brought about by means of an electric drive device 6, for example a DC motor. On the casing side, the housing 4 has at least one inlet 7 and at least one outlet 8 (cf. also FIG. 5), it going without saying that a plurality of inlets 7 and a plurality of outlets 8 can also be provided. Here, the inlets 7 can be connected, for example, to a vehicle heater, a cylinder head of the internal combustion engine or a radiator.

Figure 3:
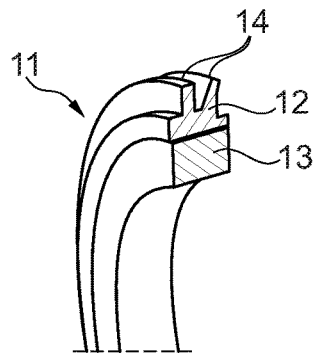
FIG. 3 shows a sectional illustration through one possible embodiment of the sealing element.
Figure 6:
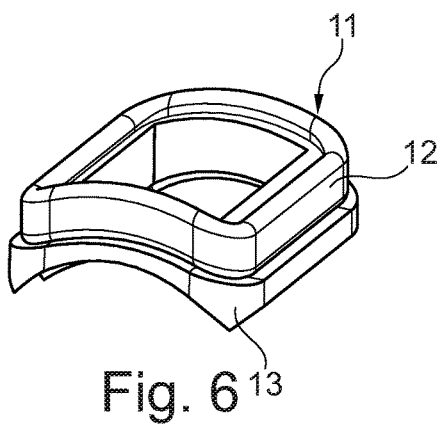
FIG. 6 shows a view of a sealing element according to the invention.
Figure 7:
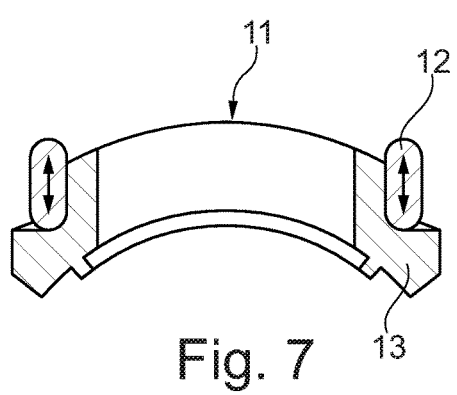
FIG. 7 shows a sectional illustration through the sealing element which is shown according to FIG. 6.

Furthermore, if the valve body 5 is considered, it can be seen that it has at least one casing-side opening 9, a plurality of casing-side openings 9 here, via which the at least one inlet 7 can be connected to the at least one outlet 8 or can be shut off from it in a manner which is dependent on the rotary angle. Here, according to the invention, a recess 10 which extends at least partially around the at least one inlet 7 and/or the at least one outlet 8, for example in the manner of a groove (cf. also FIGS. 5 and 8) is provided on an inner casing face of the housing 4, just like at least one sealing element 11 (cf. also FIGS. 2, 3 and 5 to 8) which engages into the recess 10 in the assembled state. Here, each sealing element 11 has a base 12 made from a first material and a saddle-shaped sealing sliding body 13 made from a second material which is joined to the former (cf., in particular, also FIGS. 3 and 6 and 7), the sealing element 11 sliding with its sealing sliding body 13 on the valve body 5 when the valve 1 is assembled.

Here, the first material for the base 12 of the sealing element 11 is an elastomer, for example an ethylene propylene diene monomer rubber (EPDM), a hydrogenated acrylonitrile butadiene rubber (HNBR), a fluorocarbon rubber (FKM) or an ethylene acrylic rubber (AEM). In contrast, the second material for the sealing sliding body 13 preferably has polytetrafluoroethylene (PTFE), as a result of which an extremely chemical-resistant and temperature-resistant material with an additionally extremely low coefficient of friction for the sliding contact on the valve body 5 is available. Here, the at least one sealing element 11 is preferably configured as a two-component plastic injection moulded part and, as a result, can be produced both with high quality and inexpensively. Here, the base 12 of the sealing element 11 can be configured as a bead (cf. FIGS. 6 and 7) or else can have individual holding lips 14 (cf. FIG. 3), via which the respective sealing element 11 is clamped in the associated housing-side recess 10. To this end, for example, the housing-side recess 10 can have an undercut contour.

If the valve 1 which is shown according to FIG. 1 is considered again, it can be seen that the valve body 5 is mounted in the housing 4 via at least one plain bearing, as a result of which long term smooth-running rotating of the valve body 5 and therefore switching of the valve 1 can be ensured. In general, the outlets 8 and the inlets 7 can be configured as regulated inlets and outlets 7, 8, it going without saying that it can also be provided that the housing 4 can have at least one unregulated inlet 7 and at least one unregulated outlet 8, via which a fluid flow always enters into and exits from the housing 4 in a manner which is independent of the rotary angular position of the valve body 5.

Figure 5:
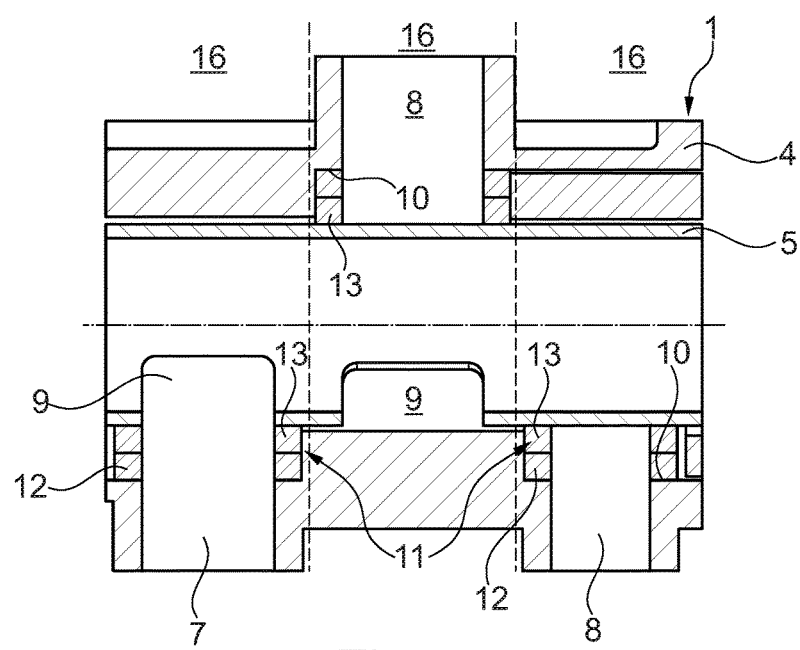
FIG. 5 shows the valve body which is shown according to FIG. 2 in the state, in which it is installed in the housing.

If the valve 1 according to FIG. 5 is considered, it can be seen that it has at least two segments 16, in each case at least one casing-side inlet 7 and/or at least one casing-side outlet 8, the valve body 5 having at least one casing-side opening 9 per segment 16, via which casing-side opening 9 the at least one inlet 7 can be connected to the at least one outlet 8 or can be shut off from it in a manner which is dependent on the rotary position.

Figure 8:
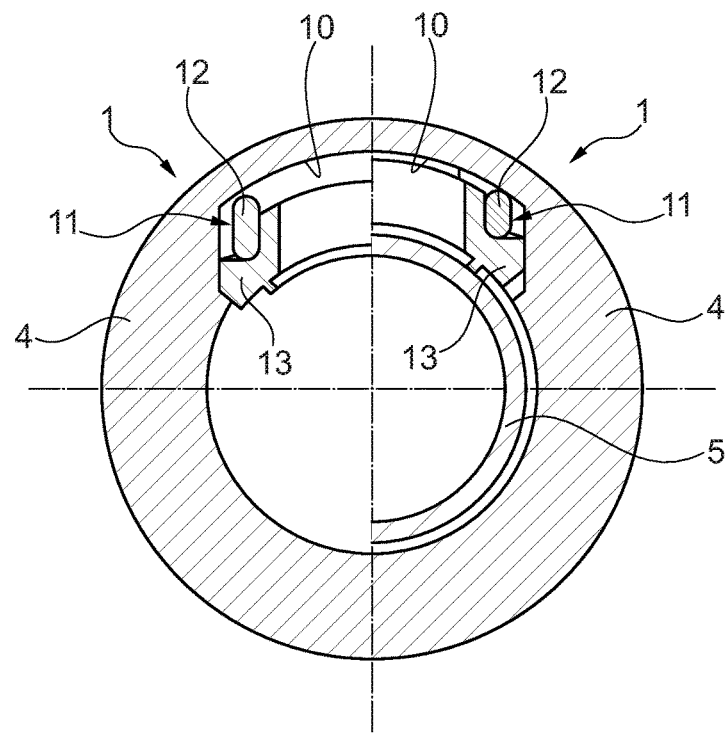
FIG. 8 shows a sectional illustration through a housing with an inserted sealing element and without an inserted valve body (left-hand image half) and with an inserted valve body (right-hand image half)

Assembly of the valve body 5 according to the invention in the housing 4 takes place as follows:

First of all, according to the left-hand image half in FIG. 8, all sealing elements 11 are inserted into the housing-side recesses 10 in such a way that they engage at least with their base 12 into the recess 10. In order to facilitate the said initially axial and subsequently radial insertion of the sealing element 11 into the associated recess 10, insertion bevels can also be provided on the base 12 or on the sealing sliding body 13 of the sealing element 11. Subsequently, the valve body 5 is pushed into the housing 4 in the axial direction, that is to say perpendicularly with respect to the plane of the image according to the left-hand image half in FIG. 8, as a result of which the sealing elements 11 are pressed at least partially into the associated housing-side recess 10.

Figure 4:
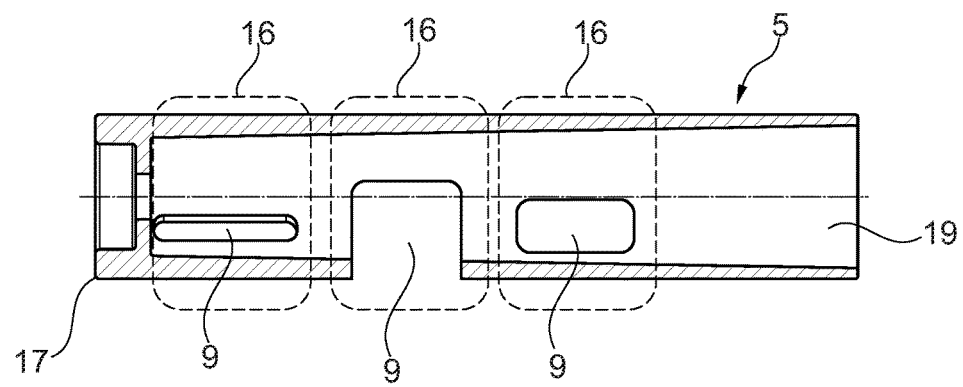
FIG. 4 shows a sectional illustration through the valve body which is shown according to FIG. 2.

In order to facilitate the pushing-in operation, the valve body 5 can have an insertion bevel 17 on an end side (cf. FIG. 4). In the case of a rotational movement of the valve body 5 relative to the housing 4, the sealing element 11 then slides on an outer circumferential face of the valve body 5 and, depending on the rotary angular position of the valve body 5, connects an outlet 7 to at least one outlet 8 or disconnects the latter from one another. The housing 4 of the valve 1 can be closed on the end side or else open, as is shown, for example, according to FIG. 1, a lid 18 closing the housing 4 on the end side in this case and corresponding inlets 7 and outlets 8 being arranged in the said lid 18. In the same way, it is also conceivable that the valve body 5 is closed on the end side (cf. FIG. 1) or else has an opening 19 on the end side (cf. FIGS. 2 and 4).

Figure 9:
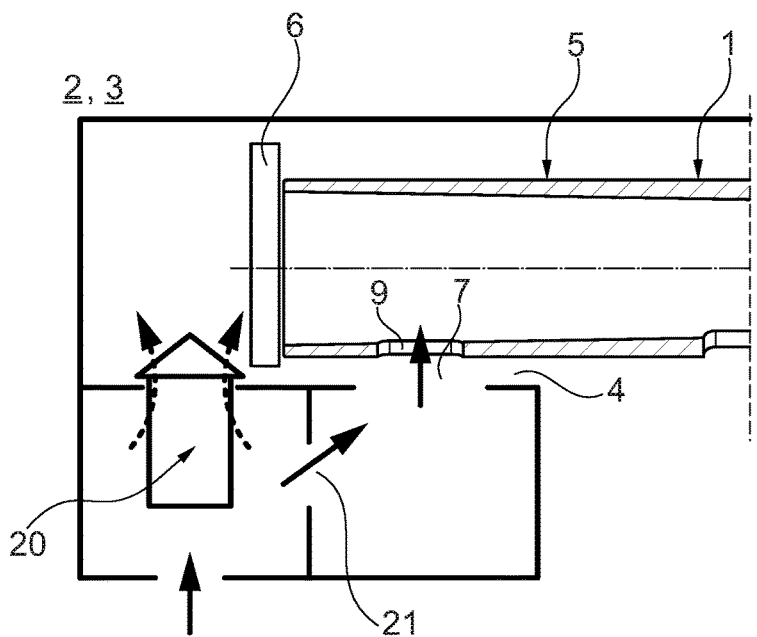
FIG. 9 shows a sectional illustration through the valve according to the invention having an upstream thermostatic valve and bypass.

If a possible use of the valve 1 according to the invention in a heating and/or cooling system 2 of a motor vehicle 3 is considered, a thermostatic valve 20 (see FIG. 9) can also be connected upstream of the valve 1, a bypass channel 21 which bypasses the thermostatic valve 20 likewise being provided, which bypass channel 21 can be controlled via the valve 1. A thermostatic valve 20 of this type serves, in particular, to open an access to an internal combustion engine only when a certain temperature of the coolant is reached, to be precise independently of the switching position of the electric valve 1. In particular, a direct connection to a cylinder block can be realised here, as a result of which the thermostatic valve 20 serves, for example, as a split cooling thermostat. The electric drive device 6 usually has a DC electric motor which is drive-connected to the valve body 5, in particular, via a gear mechanism (in particular with plastic gearwheels, a worm stage and/or a step-up transmission means). A position sensor for position confirmation can likewise be provided.

Moreover, a special contour for very small quantity control can be arranged.

By way of the valve 1 according to the invention, a valve 1 can be provided which is not only simple and, as a result, also inexpensive to assemble, but rather is also smooth-running and reliably functional in the long term.

The invention claimed is:

1. An electrically actuated valve for regulating at least one volumetric flow in at least one of a heating and a cooling system of a motor vehicle, comprising:
    a housing and a cylindrical valve body mounted rotatably therein,
    the housing having at least one casing-side inlet and at least one casing-side outlet,
    the valve body having at least one casing-side opening, via which the at least one casing-side inlet is at least one of connectable to the at least one casing-side outlet and able to be shut off from the at least one casing-side outlet in a manner which is dependent on a rotary angle;
    wherein:
        a recess extends at least partially around at least one of the at least one casing-side inlet and the at least one casing-side outlet and is provided on an inner casing face of the housing,
        at least one sealing element includes a base made from a first material, and a sealing sliding body made from a second material which is joined to the first material, and
        the at least one sealing element engages with the base in the recess and is slidable with respect to the sealing sliding body on the valve body, and
        at least one unregulated inlet and at least one unregulated outlet such that fluid flow enters into and exits from the housing independent of the rotary angular position of the valve body.

2. The valve according to claim 1, wherein the valve body is mounted rotatably in the housing via at least one plain bearing.

3. The valve according to claim 2, wherein the at least one sealing element is configured as a two-component plastic injection moulded part.

4. The valve according to claim 1, wherein the first material for the base of the sealing element has an elastomer.

5. The valve according to claim 4, wherein the elastomer is one of ethylene propylene diene monomer rubber (EPDM), hydrogenated acrylonitrile butadiene rubber (HNBR), fluorocarbon rubber (FKM) or ethylene acrylic rubber (AEM).

6. The valve according to claim 1, further comprising at least two segments each having at least one of at least one casing-side inlet and at least one casing-side outlet, the valve body having at least one casing-side opening per segment.

7. The valve according to claim 1, wherein the at least one sealing element is configured as a two-component plastic injection moulded part.

8. The valve according to claim 1, wherein the valve body is configured to be pushed axially into the housing for assembly.

9. The valve according to claim 1, wherein the housing is closed on at least one end side.

10. The valve according to claim 1, wherein the valve body is one of closed on at least one end side or has an opening.

11. The valve according to claim 1, the second material for the sealing sliding body has polytetrafluoroethylene (PTFE).

12. The valve according to claim 1, wherein the valve body has an insertion bevel on one end side.

13. The valve according to claim 1, wherein the sealing element is configured to be pushed axially into the housing for assembly.

14. An electrically actuated valve, comprising:
    at least two segments;
    a housing and a cylindrical valve body mounted rotatably therein, the housing having at least one of at least one casing-side inlet and at least one casing-side outlet in each of the at least two segments, and the valve body having at least one casing-side opening per opening, via which the at least one casing-side inlet is at least one of connectable to the at least one casing-side outlet and able to be shut off from the at least one casing-side outlet in a manner which is dependent on a rotary angle,
    a recess extending at least partially around at least one of the at least one casing-side inlet and the at least one casing-side outlet, and provided on an inner casing face of the housing, and
    at least one sealing element with a base made from a first material, and a sealing sliding body made from a second material which is joined to the first material, the at least one sealing element engaging in the recess via the base and slidable on the valve body via the sealing sliding body; and
    at least one unregulated inlet and at least one unregulated outlet are such that fluid flow into and exits from the housing independent of the rotary angular position of the valve body.

15. A heating or cooling system of a motor vehicle, comprising an electrically actuated valve for regulating at least one volumetric flow in the heating or cooling system, the electrically actuated valve including:
- a housing and a cylindrical valve body mounted rotatably therein, the housing having at least one casing-side inlet and at least one casing-side outlet, and the valve body having at least one casing-side opening, via which the at least one casing-side inlet is at least one of connectable to the at least one casing-side outlet and able to be shut off from the at least one casing-side outlet in a manner which is dependent on a rotary angle,
- a recess extending at least partially around at least one of the at least one casing-side inlet and the at least one casing-side outlet, and provided on an inner casing face of the housing, and
- at least one sealing element with a base made from a first material, and a sealing sliding body made from a second material which is joined to the first material, the at least one sealing element engaging in the recess via the base and slidable on the valve body via the sealing sliding body;
- at least one unregulated inlet and at least one unregulated outlet are such that fluid flow into and exits from the housing independent of the rotary angular position of the valve body.

16. The heating or cooling system of claim 15, wherein the valve has a thermostatic valve connected upstream of the electrically actuated valve.

17. The heating or cooling system of claim 16, further comprising a bypass channel, which bypasses the thermostatic valve, wherein the bypass channel is controllable via the electrically actuated valve.

\* \* \* \* \*